United States Patent
Gu et al.

(10) Patent No.: US 11,421,470 B2
(45) Date of Patent: Aug. 23, 2022

(54) COIL SKEW CORRECTION TECHNIQUES FOR ELECTRIC POTENTIALLY-DRIVEN SHADE, AND/OR ASSOCIATED METHODS

(71) Applicant: GUARDIAN GLASS, LLC, Auburn Hills, MI (US)

(72) Inventors: Yabei Gu, Auburn Hills, MI (US); Rudolph Petrmichl, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 127 days.

(21) Appl. No.: 16/792,348

(22) Filed: Feb. 17, 2020

(65) Prior Publication Data
US 2021/0254397 A1 Aug. 19, 2021

(51) Int. Cl.
| | |
|---|---|
| G02B 26/00 | (2006.01) |
| E06B 3/67 | (2006.01) |
| C03C 27/10 | (2006.01) |
| E06B 9/24 | (2006.01) |
| G02B 26/02 | (2006.01) |

(52) U.S. Cl.
CPC ............ *E06B 3/6722* (2013.01); *C03C 27/10* (2013.01); *E06B 9/24* (2013.01); *G02B 26/023* (2013.01); *E06B 2009/2464* (2013.01)

(58) Field of Classification Search
CPC ........ G02B 23/00; G02B 26/023; G02B 5/28; G02B 5/281; G02B 5/282
See application file for complete search history.

(56) References Cited

U.S. PATENT DOCUMENTS

| | | | |
|---|---|---|---|
| 3,236,290 A | 2/1966 | Lueder | |
| 3,897,997 A | 8/1975 | Kalt | |
| 3,989,357 A | 11/1976 | Kalt | |
| 4,094,590 A | 6/1978 | Kalt | |
| 4,105,294 A | 8/1978 | Peck | |

(Continued)

FOREIGN PATENT DOCUMENTS

| | | |
|---|---|---|
| EP | 1241507 | 5/2005 |
| JP | 2005-089643 | 4/1995 |

(Continued)

OTHER PUBLICATIONS

International Search Report and Written Opinion received for PCT Application No. PCT/IB2021/051326, dated May 27, 2021, 12 pages.

(Continued)

*Primary Examiner* — Joseph P Martinez

(57) ABSTRACT

Certain example embodiments relate to electric, potentially-driven shades usable with insulating glass (IG) units, IG units including such shades, and/or associated methods. In such a unit, a dynamic shade is located between the substrates defining the IG unit, and is movable between retracted and extended positions. The dynamic shade includes on-glass layers including a transparent conductor and an insulator or dielectric film, as well as a shutter. The shutter includes a resilient polymer, a conductor, and optional ink. The on-glass transparent conductor may be patterned into different areas. If shutter coil skew is detected, voltage(s) may be applied one or more areas of the on-glass transparent conductor to compensate for or otherwise attempt to correct the detected coil skew.

26 Claims, 7 Drawing Sheets

(56) References Cited

U.S. PATENT DOCUMENTS

| | | |
|---|---|---|
| 4,208,103 A | 6/1980 | Kalt et al. |
| 4,248,501 A | 2/1981 | Simpson |
| 4,266,339 A | 5/1981 | Kalt |
| 4,336,536 A | 6/1982 | Kalt et al. |
| 4,383,255 A | 5/1983 | Grandjean et al. |
| 4,468,663 A | 8/1984 | Kalt |
| 4,488,784 A | 12/1984 | Kalt et al. |
| 4,695,837 A | 9/1987 | Kalt |
| 4,747,670 A | 5/1988 | Devio et al. |
| 4,788,089 A | 11/1988 | Skipper |
| 4,915,486 A | 4/1990 | Hansen |
| 4,978,952 A | 12/1990 | Irwin |
| 5,231,559 A | 7/1993 | Kalt et al. |
| 5,519,565 A | 5/1996 | Kalt et al. |
| 5,554,434 A | 9/1996 | Park et al. |
| 5,629,790 A | 5/1997 | Neukermans et al. |
| 5,638,084 A | 6/1997 | Kalt |
| 6,057,814 A | 5/2000 | Kalt |
| 6,075,639 A | 6/2000 | Kino et al. |
| 6,081,304 A | 6/2000 | Kuriyama et al. |
| 6,229,509 B1 | 5/2001 | Deluca et al. |
| 6,317,108 B1 | 11/2001 | Kalt |
| 6,557,279 B2 | 5/2003 | Araki et al. |
| 6,692,646 B2 | 2/2004 | Kalt et al. |
| 6,771,237 B1 | 8/2004 | Kalt |
| 6,887,575 B2 | 5/2005 | Neuman |
| 6,897,786 B1 | 5/2005 | Kalt |
| 6,972,888 B2 | 12/2005 | Poll et al. |
| 7,056,588 B2 | 6/2006 | Neuman |
| 7,085,609 B2 | 8/2006 | Bechtel et al. |
| 7,189,458 B2 | 3/2007 | Ferreira |
| 7,198,851 B2 | 4/2007 | Lemmer |
| 7,645,977 B2 | 1/2010 | Schlam et al. |
| 7,705,826 B2 | 4/2010 | Kalt et al. |
| 7,771,830 B2 | 8/2010 | Neuman |
| 7,998,320 B2 | 8/2011 | Laird |
| 8,035,075 B2 | 10/2011 | Schlam et al. |
| 8,134,112 B2 | 3/2012 | Schlam et al. |
| 8,557,391 B2 | 10/2013 | Frank et al. |
| 8,668,990 B2 | 3/2014 | Broadway |
| 8,736,938 B1 | 5/2014 | Schlam et al. |
| 8,925,286 B2 | 1/2015 | Hagen et al. |
| 8,982,441 B2 | 3/2015 | Schlam et al. |
| 9,229,291 B2 | 1/2016 | Kailasam et al. |
| 9,556,066 B2 | 1/2017 | Frank |
| 9,670,092 B2 | 6/2017 | Lemmer |
| 9,695,085 B2 | 7/2017 | Lemmer |
| 9,796,619 B2 | 10/2017 | Broadway |
| 9,802,860 B2 | 10/2017 | Frank |
| 10,162,240 B2 | 12/2018 | Rozbicki |
| 10,288,969 B2 | 5/2019 | Kailasam et al. |
| 10,788,723 B2 | 9/2020 | Rozbicki et al. |
| 10,794,110 B2 | 10/2020 | Vandal et al. |
| 10,801,258 B2 | 10/2020 | Krasnov et al. |
| 10,831,077 B2 | 11/2020 | Kailasam et al. |
| 10,871,027 B2 | 12/2020 | Petrmichl et al. |
| 10,876,349 B2 | 12/2020 | Blush et al. |
| 10,895,102 B2 | 1/2021 | Frey et al. |
| 10,914,114 B2 | 2/2021 | Blush et al. |
| 10,927,592 B2 | 2/2021 | Blush et al. |
| 2002/0144831 A1 | 10/2002 | Kalt |
| 2010/0172007 A1 | 7/2010 | Schlam et al. |
| 2013/0188235 A1* | 7/2013 | Floyd .................. E06B 9/24 359/230 |
| 2014/0272314 A1 | 9/2014 | Veerasamy |
| 2014/0338846 A1 | 11/2014 | Hikmet et al. |
| 2017/0184221 A1 | 6/2017 | Mcnamara et al. |
| 2022/0018181 A1 | 1/2022 | Koskulics et al. |

FOREIGN PATENT DOCUMENTS

| | | | |
|---|---|---|---|
| JP | 10-249278 | 9/1998 | |
| KR | 10-2009-0008928 | 1/2009 | |
| KR | 10-2013-0011845 | 1/2013 | |
| WO | 2018138105 A1 | 8/2018 | |
| WO | WO2018138105 * | 8/2018 | ............ G02F 1/13 |
| WO | 2020008432 A1 | 1/2020 | |
| WO | 2020008438 A1 | 1/2020 | |

OTHER PUBLICATIONS

U.S. Appl. No. 16/779,990, filed Feb. 3, 2020; Yabei Gu
U.S. Appl. No. 16/779,927, filed Feb. 3, 2020; Koskulics.
International Search Report and Written Opinion received for PCT Application No. PCT/IB2021/050867, dated May 21, 2021, 10 Pages.
International Search Report and Written Opinion received for PCT Application No. PCT/IB2021/050870, dated May 19, 2021, 10 Pages.
Notice of Allowance received for U.S. Appl. No. 16/779,990, dated Aug. 6, 2021, 9 Pages.

* cited by examiner

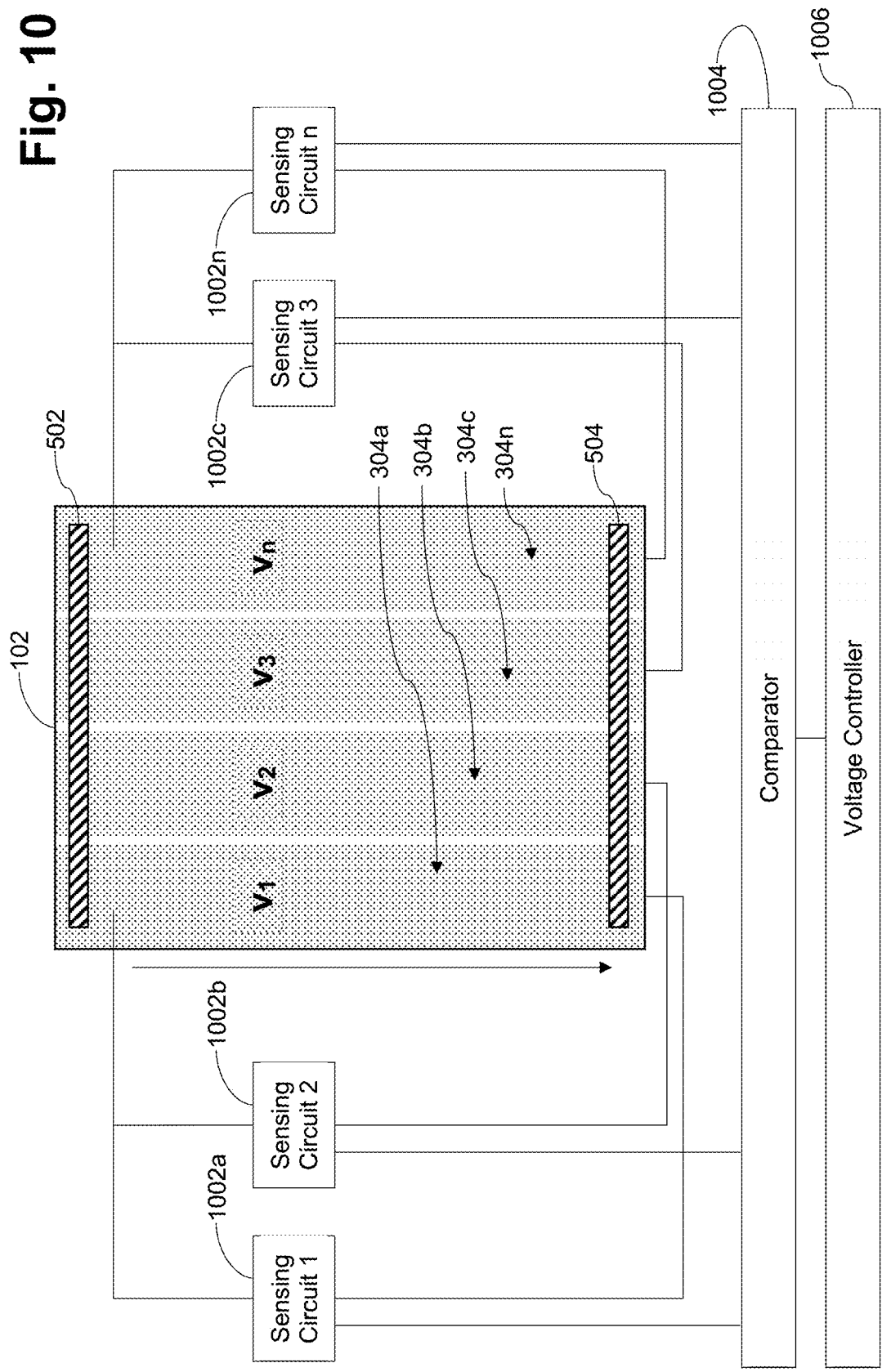

COIL SKEW CORRECTION TECHNIQUES FOR ELECTRIC POTENTIALLY-DRIVEN SHADE, AND/OR ASSOCIATED METHODS

TECHNICAL FIELD

Certain example embodiments of this invention relate to shades that may be used with insulating glass units (IG units or IGUs), IG units including such shades, and/or methods of making the same. More particularly, certain example embodiments of this invention relate to electric, potentially-driven shades that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's isolation, and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances.

Windows are unique elements in most buildings in that they have the ability to "supply" energy to the building in the form of winter solar gain and daylight year around. Current window technology, however, often leads to excessive heating costs in winter, excessive cooling in summer, and often fails to capture the benefits of daylight, that would allow lights to be dimmed or turned off in much of the nation's commercial stock.

Thin film technology is one promising way of improving window performance. Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric, potentially-driven shades that may be used with IG units, IG units including such shades, and/or methods of making the same.

In certain example embodiments, an insulating glass (IG) unit is provided. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes a first conductive coating provided, directly or indirectly, on the interior major surface of the first substrate, the first conductive coating being divided into a plurality of zones that are electrically isolated from one another; a dielectric or insulator film provided, directly or indirectly, on the first conductive coating; and a shutter including a polymer substrate supporting a second conductive coating, wherein the polymer substrate is extendible to a shutter closed position and retractable to a shutter open position; the first and/or second conductive coatings are electrically connectable to a power source that is controllable to set up an electric potential difference and create electrostatic forces to drive the polymer substrate to the shutter closed position.

In certain example embodiments, a glass substrate comprises a dynamically controllable shade provided thereon. The shade includes a first conductive coating provided, directly or indirectly, on a major surface of the substrate, with the first conductive coating being divided into a plurality of zones that are electrically isolated from one another; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position.

In certain example embodiments, a method of making an insulating glass (IG) unit is provided. The method comprises: having first and second substrates, each having interior and exterior major surfaces, the interior major surface of the first substrate facing the interior major surface of the second substrate; and providing a dynamically controllable shade on the first and/or second substrate. The shade includes a first conductive coating provided, directly or indirectly, on the interior major surface of the first substrate, with the first conductive coating being divided into a plurality of zones that are electrically isolated from one another; a dielectric or insulator film provided, directly or indirectly, on the first conductive coating; and a shutter including a polymer substrate supporting a second conductive coating, wherein the polymer substrate is extendible to a shutter closed position and retractable to a shutter open position. The first and second substrates are connected to one another in substantially parallel, spaced apart relation, such that a gap is defined therebetween and such that the dynamically controllable shade is located in the gap. The first and/or second conductive coatings are electrically connectable to a power source that is controllable to set up an electric potential difference and create electrostatic forces to drive the polymer substrate to the shutter closed position.

In certain example embodiments, sensing circuitry may be configured to measure capacitances at different zones.

In certain example embodiments, the polymer substrate may be structured to coil when retracting and uncoil when extending, and the IG unit may further comprise a controller configured to infer whether the polymer substrate coil is skewing during extension and/or retraction, based on the measured capacitances.

In certain example embodiments, skew of the polymer substrate coil may be inferred based on different zones having measured capacitances that differ from one another by more than a predetermined threshold, based on different zones having measured capacitances that differ from measured capacitance(s) of one or more reference zones by more than a predetermined threshold (e.g., with the one or more reference zones being the outermost zone(s) in the IG unit), etc.

In certain example embodiments, the controller may be further configured to control the power source to selectively deliver voltage(s) to the zones to correct inferred skew of the polymer substrate coil.

In certain example embodiments, the polymer substrate may be configured to preferentially extend proximate to zones that receive voltage(s) compared to other zones that do not.

In certain example embodiments, a method of operating a dynamic shade in an insulating glass (IG) unit is provided. The method comprises having an IG unit made in accordance with the techniques disclosed herein; and providing voltage(s) to one or more zones to help correct shutter skew. For instance, the method may comprising selectively activating the power source to move the polymer substrate between the shutter open and closed positions and providing power to the zones, selectively, to correct for skew in the polymer substrate coil.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 10 is a schematic view showing the FIG. 9A example with a plurality of sensing circuits and a voltage controller for correcting coil skew, in accordance with certain example embodiments;

DETAILED DESCRIPTION

Figure 1:
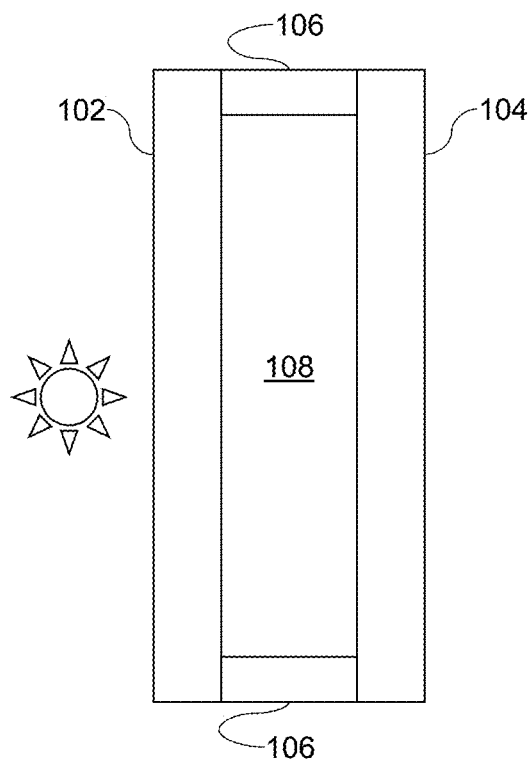
FIG. 1 is a cross-sectional, schematic view of an example insulating glass unit (IG unit or IGU)
Figure 2:
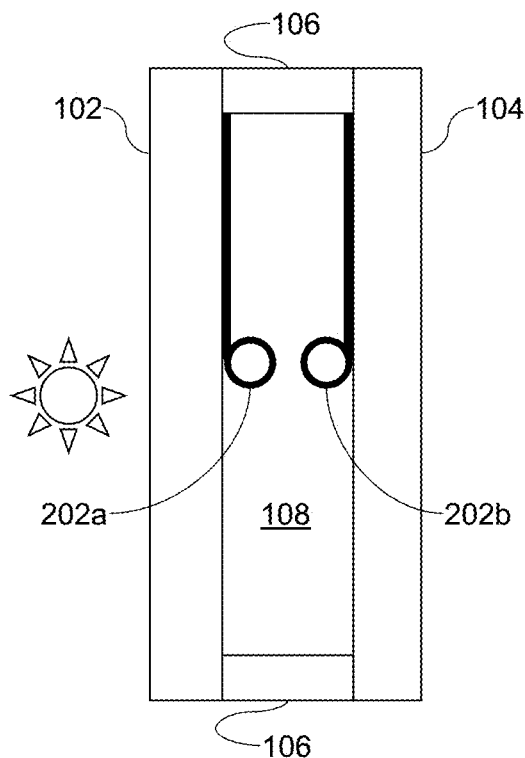
FIG. 2 is a cross-sectional, schematic view of an example IGU incorporating electric potentially-driven shades that may be used in connection with certain example embodiments.

Certain example embodiments of this invention relate to electric, potentially-driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric potentially-driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric potentially-driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b adhere strongly to the adjacent substrates 102 and 104.

The shades 202a and 202b extend along all or a portion of a vertical length of the visible or "framed" area of the substrates 102 and 104 from a retracted configuration to an extended configuration. In the retracted configuration, the shades 202a and 202b have a first surface area that substantially permits radiation transmission through the framed area. In the extended configuration, the shades 202a and 202b have a second surface area that substantially controls radiation transmission through the framed area. The shades 202a and 202b may have a width that extends across all or a portion of the horizontal width of the framed area of the substrates 102 and 104 to which they are attached.

Each of the shades 202a and 202b is disposed between the first and second substrates 102 and 104, and each preferably is attached at one end to an inner surface thereof (or a dielectric or other layer disposed thereon), near the tops thereof. An adhesive layer may be used in this regard. The shades 202 and 204 are shown partially rolled out (partially extended) in FIG. 2. The shades 202a and 202b and any adhesive layer or other mounting structure preferably are hidden from view so that the shades 202a and 202b are only seen when at least partially rolled out.

The diameter of a fully rolled-up shade preferably is about 1-5 mm but may be greater than 5 mm in certain example embodiments. Preferably, the diameter of a rolled-up shade is no greater than the width of the gap 108, which is typically about 10-15 mm, in order to help facilitate rapid and repeated roll-out and roll-up operations. Although two shades 202a and 202b are shown in the FIG. 2 example, it will be appreciated that only one shade may be provided in certain example embodiments, and it also will be appreciated that that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202a and 202b. The electronic controller may be electrically connected to the shades 202a and 202b, as well as the substrates 102 and 104, e.g., via suitable leads or the like. The leads may be obscured from view through the assembled IG unit. The electronic controller is configured to provide an output voltage to the shades 202a and 202b. Output voltage in the range of about 100-500 V DC can be used for driving the shades 202a and 202b in certain example embodiments. An external AC or DC power supply, a DC battery, and/or the like may be used in this regard. It will be appreciated that higher or lower output voltage may be provided, e.g., depending on the fabrication parameters and materials that comprise the shades 202a and 202b, the layers on the substrates 102 and 104, etc.

The controller may be coupled to a manual switch, remote (e.g., wireless) control, or other input device, e.g., to indicate whether the shades 202a and 202b should be retracted or extended. In certain example embodiments, the electronic controller may include a processor operably coupled to a memory storing instructions for receiving and decoding control signals that, in turn, cause voltage to be selectively applied to control the extension and/or retraction of the shades 202a and 202b. Further instructions may be provided so that other functionality may be realized. For instance, a timer may be provided so that the shades 202a and 202b can be programmed to extend and retract at user-specified or other times, a temperature sensor may be provided so that the shades 202a and 202b can be programmed to extend and retract if user-specified indoor and/or outdoor temperatures are reached, light sensors may be provided so that the shades 202a and 202b can be programmed to extend and retract based on the amount of light outside of the structure, etc.

Although two shades 202a and 202b are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc.

In certain example embodiments, a locking restraint may be disposed at the bottom of the IGU, e.g., along its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Figure 3:
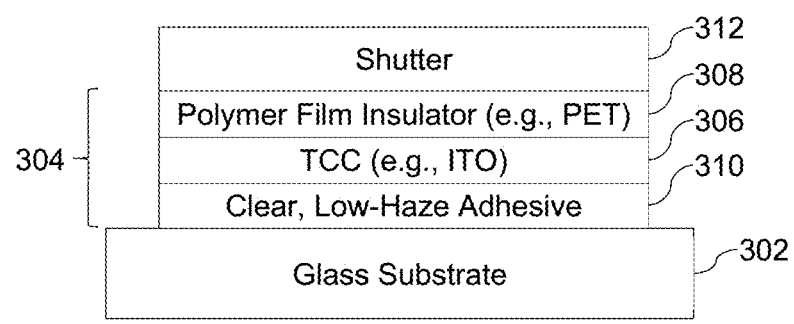
FIG. 3 is a cross-sectional view showing example on-glass components from the FIG. 2 example IGU that enable shutter action, in accordance with certain example embodiments.
Figure 4:
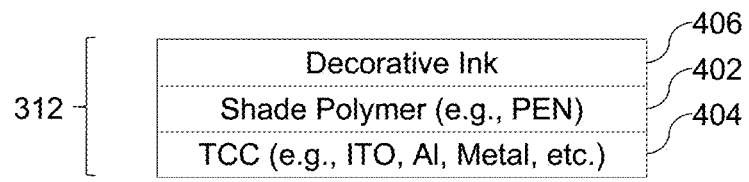
FIG. 4 is a cross-sectional view of an example shutter from the FIG. 2 example IGU, in accordance with certain example embodiments.

Example details of the operation of the shades 202a and 202b will now be provided in connection with FIGS. 3-4. More particularly, FIG. 3 is a cross-sectional view showing example on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when unrolled, the conductor 404 may be closer to the substrate 302 than the ink layer 406. In other example embodiments, this arrangement may be reversed such that, for example, when unrolled, the conductor 404 may be farther from the substrate 302 than the ink layer 406.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor.

The transparent conductor 306 may be formed from any suitable material such as, for example, ITO, tin oxide (e.g., SnO$_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethyleneterephthalate (PET), polyimide (PI), and polyethylenenapthalate (PEN), etc. The dielectric material 308 may have a thickness of 4-25 microns in certain example embodiments. The thickness of the dielectric material 308 may be selected so as to balance reliability of the shade with the amount of voltage (e.g., as thinner dielectric layers typically reduce reliability, whereas thicker dielectric layers typically require a high applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-50 nm thick material including a layer comprising, for example, ITO, Al, Ni, NiCr, tin oxide, and/or the like, may be used. In certain example embodiments, the resistance of the conductor 404 may be in the range of 40-200 ohms/square.

The decorative ink 406 may include pigments, particles, and/or other materials that selectively reflect and/or absorb desired visible colors and/or infrared radiation.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When an electrical drive is provided between the variable electrode and the fixed electrode, e.g., when an electric drive of voltage or current is applied between the conductor 404 of the shutter 312 and the conductor 306 on the substrate 302, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade selectively reflects or absorbs certain visible colors and/or infrared radiation. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the electrical drive between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 12 microns thick. A PVC-based ink available from Sun Chemical Inc. applied to 3-8 microns thickness may be used as the decorative ink 406. A PEN material commercially available from DuPont that is 6, 12, or 25 microns thick may be used as the resilient layer 402. For an opaque conductor 406, evaporated Al that has a nominal thickness of 375 nm may be used. For a transparent option, sputtered ITO may be used. In both cases, the resistance may be 100-400 ohms/square. The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor 402 may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same. For example, an excess of stress in a thin film layer stack typically is seen as disadvantageous. However, in some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's melting temperature to the substrate temperature. Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg32~32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechanical properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

|  |  | PEN | PEEK | PI |
|---|---|---|---|---|
| 25 degrees C. | UTS (psi) | 39,000 | 16,000 | 33,500 |
|  | Modulus (psi) | 880,000 | 520,000 | 370,000 |
|  | Yield (psi) | 17,500 |  | 10,000 |
| 200 degrees C. | UTS (psi) | 13,000 | 8,000 | 20,000 |
|  | Modulus (psi) |  |  | 290,000 |
|  | Yield (psi) | <1,000 |  | 6,000 |
| Tg |  | ~121 degrees C. | ~143 degrees C. | ~380 degrees C. |

It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applications, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5 \times 10'/k$ for Al down to $4.8 \times 10^{-6}/k$ for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo. Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Certain example embodiments may include microscopic perforations or through-holes that allow light to pass through the shade and provide progressive amounts of solar transmittance based on the angle of the sun.

Further manufacturing, operation, and/or other details and alternatives may be implemented. See, for example, U.S. Pat. Nos. 8,982,441; 8,736,938; 8,134,112; 8,035,075; 7,705,826; and 7,645,977, as well as U.S. application Ser. No. 16/028,546 filed Jul. 6, 2018; the entire contents of each of which is hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

One issue associated with the dynamic shade design is that the shutter may extend or unfurl quickly and contact the bottom stopper or holder with a force sufficient to cause a tick sound. That is, in certain example embodiments, the on-glass components (including the TCC 306 and the polymer 308) are provided across all or substantially all of the surface of the substrate 302. Top and bottom stoppers sit on these on-glass components and may be electrically connected to the TCC 306. During deployment of the shutter, the shutter will extend until it hits the end stopper and cause the tick sound. Some people perceive this tick sound as an annoyance, and the tick sound thus may make the shade less pleasant to use to at least some people.

To help address the tick sound issue, certain example embodiments implement means for decelerating the shutter as is extends and, more particularly, as it extends to lengths proximate to the bottom stopper or holder. The shutter still extends quite well, as the deceleration occurs as the shutter is nearly fully extended. In other words, the electrostatic forces that initiate the movement and sustain it through the initial phases of the extension are unchanged, and they are selectively altered towards the fully extended position.

This deceleration may be accomplished in certain example embodiments by affecting the electrostatic forces in an area proximate to the bottom stopper. Weaker electrostatic forces can cause the shutter to extend or unfurl at a slower speed.

The shutter therefore can extend towards the bottom stopper in a controlled manner by virtue of the area of altered electrostatic forces which, in turn, can be created by introducing a conductivity difference in the corresponding area proximate to the bottom stopper.

Figure 5:
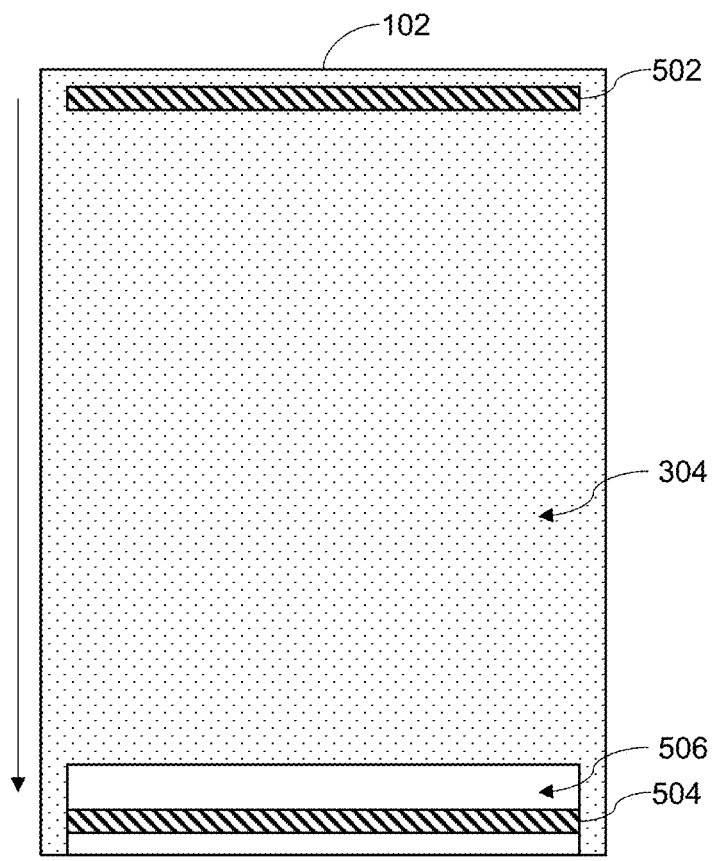
FIG. 5 is a plan view of a substrate incorporating on-glass components from the FIG. 2 example IGU, along with an area promoting a conductivity difference, in accordance with certain example embodiments.

FIG. 5 is a plan view of a substrate 102 incorporating on-glass components 304 from the FIG. 2 example IGU, along with an area 506 promoting this conductivity difference, in accordance with certain example embodiments. The FIG. 5 example shows a top stopper 502 and a bottom stopper 504. The shutter extends in the direction of the arrow, from the top stopper 502 to the bottom stopper 504.

Figure 6A:
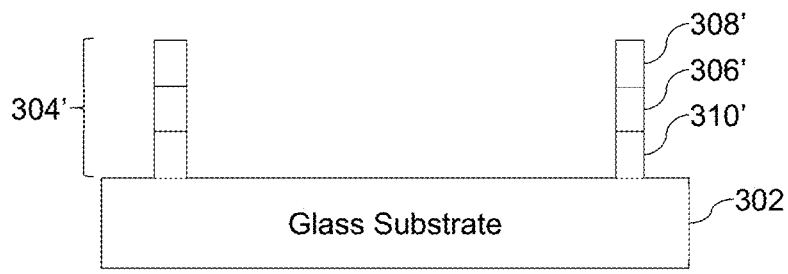
FIG. 6A is a cross-sectional view of FIG. 5, taken through a first example area promoting a conductivity difference, in accordance with certain example embodiments.

This area 506 with altered electrostatic forces may be created in a number of different ways. For example, FIG. 6A is a cross-sectional view of FIG. 5, taken through a first example area promoting a conductivity difference, in accordance with certain example embodiments. As shown in FIG. 6A, the on-glass components 304' are partially removed in region 506. That is, the polymer film insulator 308' and TCC 306', and possibly the adhesive 310' are discontinuous in this area. They extend towards the sides of the substrate 302, but they are missing from the center region proximate to the bottom stopper 504. In this configuration, the on-glass components 304 may be thought of as being absent from area 506 shown in FIG. 5.

This FIG. 6A configuration may be manufactured in a number of different ways. As one example, if the polymer film insulator 306 with the TCC 308 is simply applied (e.g., rolled) onto the substrate 302, it may be applied to the substrate 302 in areas remote from area 506. For instance, a large area may be applied over from the top of the substrate to the top of the area 506, and smaller strips may be applied along the sides of area 506. In another example, masking may be used to ensure that any TCC and polymer film insulator provided in the area 506 can be easily removed. Masking may be useful if these materials are provided as a sheet, if sputtering is used to form the TCC and the polymer is provided via a wet technique, etc. In still another example, the substrate 302 can be blanket coated (e.g., using a preformed sheet that is rolled out across the substrate, using sputtering and liquid coating, etc.), and then the blanked coated material can be removed in the area 506. Depending on the approach used to form the on-glass components 304, some adhesive may or may not be left in the on-glass components 304' even in region 506.

Figure 6B:
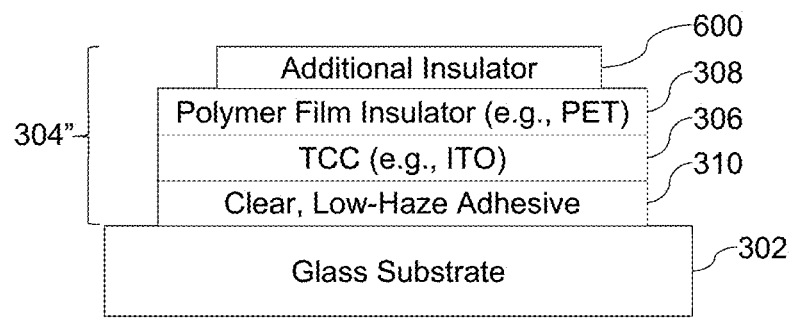
FIG. 6B is a cross-sectional view of FIG. 5, taken through a second example area promoting a conductivity difference between the on-glass and on-shutter components, in accordance with certain example embodiments.

As an alternative to the FIG. 6A arrangement, FIG. 6B is a cross-sectional view of FIG. 5, taken through a second example area promoting a conductivity difference between the on-glass and on-shutter components, in accordance with certain example embodiments. The on-glass components 304" in the FIG. 6B example include an additional insulator material 600 provided in the area 506 where the electrostatic forces are to be altered. This additional insulator may be an additional clear polymer-based material such as, for example, any of the materials described above (e.g., PET, PEN, PEEK, PI, etc.). A polymer may be rolled onto, applied over, or otherwise formed in the area 506. Alternatively, or in addition, thin film dielectric or other materials also may be used for the additional insulator 600 in certain example embodiments. These thin film materials may be formed on the underlying substrate 302 in the area 506 in any suitable manner. It may effectively electrically insulate the TCC 306 in the on-glass components 304" in the region 506 from the TCC 404 on the shutter 312, or it may at least increase the electrical resistance between them.

Figure 7:
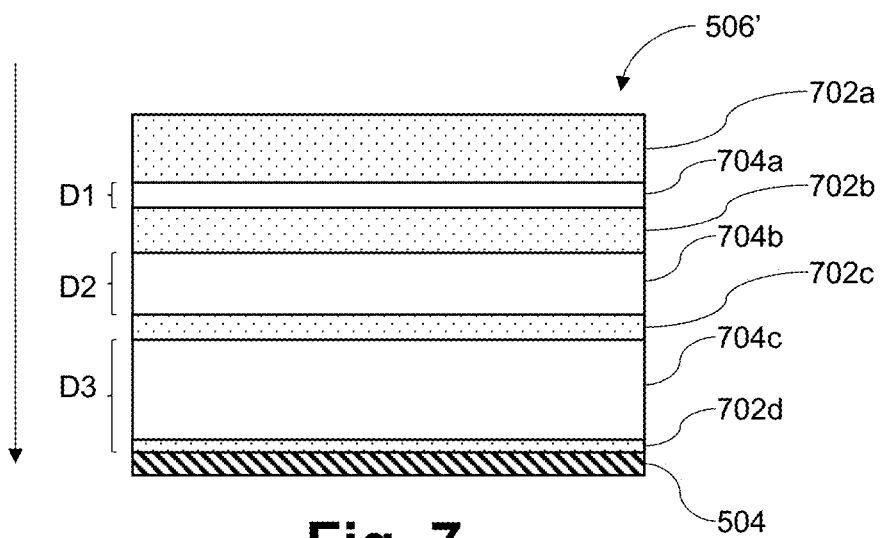
FIG. 7 is a plan view of a third example area promoting a conductivity difference, in accordance with certain example embodiments.

FIG. 7 is a plan view of a third example area 506' promoting a conductivity difference, in accordance with certain example embodiments. The arrow shows the travel direction of the shutter, as above. This area 506' may be thought of as including a plurality of on-glass segments 702a-702d separated by areas 704a-704c where the on-glass components are removed (e.g., as described above in connection with FIG. 6A) and/or where additional insulating materials are added (e.g., as described above in connection with FIG. 6B).

In certain example embodiments, the on-glass segments 702a-702d can have the same configuration (e.g., the height and/or width across the substrate), but different example embodiments may use different configurations for these on-glass segments 702a-702d. The FIG. 7 example uses the former configuration, as the segments 702a-702d become smaller and smaller as they approach the bottom stopper 504. This may be advantageous because smaller forces may be provided by virtue of these smaller areas creating a "soft landing" of the shutter on the bottom stopper 504, while also providing occasional "impulses" such that the shutter is encouraged to continue to extend even though it is slowing down. In other words, this arrangement may help ensure that the shutter does not stop short of the bottom stopper 504 and also may help ensure that it reaches it in a more controlled manner.

In certain example embodiments, the on-glass segments 702a-702d can be uniformly spaced apart, or spaced apart in some other way. The FIG. 7 example uses the latter configuration, as the distance D1 between segment 702a and segment 702b is smaller than the distance D2 between segment 702b and segment 702c, and the distance D2 between segment 702b and segment 702c is smaller than the distance D3 between segment 702c and segment 702d. Another way of thinking of this is that the areas 704a-704c may increase in size (e.g., the height and/or width across the substrate) as they move towards the bottom stopper 504.

Although four on-glass segments 702a-702d and three areas 704a-704c are shown in the FIG. 7 example embodiment, more or fewer of one or both may be provided in certain example embodiments. In addition, although FIG. 7 shows an on-glass segment 702d directly adjacent to an upper side of (and impliedly also under) the bottom stopper 504, different example embodiments may provide electrical contact to the bottom stopper 504 from its bottom side or some other way. Thus, on-glass segment 702d may be thought of as being relocatable to the bottom side of bottom stopper 504.

It will be appreciated that the FIG. 7 example embodiment may be manufactured using the techniques described above in connection with FIG. 6A and/or FIG. 6B, with those techniques in general simply being repeated for the different segments.

These segments in an embodiment similar to FIG. 7 (e.g., where there are multiple on-glass component segments) may be controlled collectively and/or individually in different example embodiments. For instance, voltage may be provided to all segments at once, or voltage may be provided to individual segments in a more controlled manner. The former may be advantageous from an ease of implementation perspective. On the other hand, the latter may be advantageous for more actively controlling (e.g., slowing) the speed, lowering power requirements, etc. A timer may be implemented so that the different segments can be activated in sequence in certain example embodiments. In certain example embodiments, an imager (e.g., a camera, infrared (IR) sensor, or the like) can be used to track the progress of the shutter as it is extending. A controller may receive a signal from the imager and, based on the location of the shutter determined therefrom, selectively activate one or more individual ones of the segments, e.g., to ensure that it is moving and/or moving at an appropriate rate.

It thus will be appreciated that there can be active and/or passive control over the shutter moves, especially as it approaches the bottom stop. Passive control can be provided by defining characteristics of the area 506 in accordance with the FIG. 6A and FIG. 6B example techniques, as well as when the FIG. 7 example techniques are used in connection with a common voltage "trigger" provided to each segment. Active control can be provided by individually activating segments in the FIG. 7 example, for instance. Either way, there is enough force to drive the shutter, but the force is attenuated proximate to the bottom stopper so as to avoid the click sound (or to at least significantly reduce it to a non-perceivable and/or non-annoying level).

Although certain example embodiments have been described as creating an area with different electrostatic forces and/or conductivity differences in connection with the on-glass components, it will be appreciated that the approaches described herein can be used in connection with the shutter 312 (including the TCC 404 thereof). Modifications alternatively or additionally can be made to the shutter 312 when it is being formed (e.g., prior to rolling), when extended, etc., so as to create the effects of the areas described above.

In certain example embodiments, with respect to the area where the conductive coating (e.g., ITO) is to be removed, the dimensions (absolute or relative to the bar), could be anywhere between almost zero and the characteristic width of the shade diameter. In some cases, there basically will be no lower limit for such dimension because the applied voltage in that area can be lowered to reach the deceleration goal. In some cases, for the upper limit of such dimension, it may in some instances be desirable to ensure that the shade will still be impacted by the electrostatic force field, which could impose a limitation in practice.

The examples above help cause the shutter to decelerate as it approaches the end stopper. The shutter may stop completely before contact with the bottom stopper, or it may slow to a speed sufficient for the shutter to have a "soft landing" with respect to the bottom stopper. Thus, certain example embodiments may reduce or possibly even eliminate a human-perceivable (e.g., audible) tick sound.

In certain example embodiments, the shade may unfurl with an initial speed that slows to a final speed during the unfurling. The deceleration may slow at a constant or non-constant rate. The final speed may be to a complete or near-complete stop (e.g., zero or near-zero speed). In this way, the shade may "soft land" onto the bottom stop. In certain example embodiments, the shade need not necessarily touch the bottom stop during the soft landing. That is, in certain example embodiments, a bottom stop may not be provided. In certain example embodiments where a stop is provided, the stop may be a means for providing an electrostatic force to hold the shade in the extended position, and the shade may or may not contact the stopper in such cases.

Figure 8:
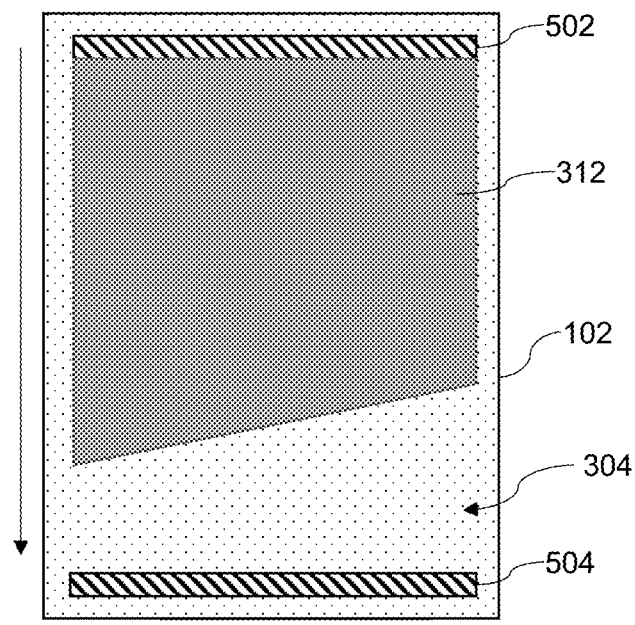
FIG. 8 is a plan view showing how a shutter can become skewed or misaligned in some instances.

Another issue associated with the dynamic shade design is that the shutter coil sometimes skews or otherwise misaligns during retraction and/or extension. FIG. 8 is a plan view showing how a shutter can become skewed or misaligned in some instances. As shown in FIG. 8, the shutter 312 is skewed during unfurling and/or retraction, as the left side of the coil is "lower" (more extended and less retracted) than the right side of the coil. These skewing/misalignment problems can be annoying and can make the dynamic shade less pleasant to use. It will be appreciated that similar top and bottom misalignments may occur in a horizontally unfurling embodiment.

To help address the shutter coil skewing issue, certain example embodiments provide voltage(s) to one or more portions of the on-glass conductive layer. In certain example embodiments, this may be facilitated by patterning or otherwise dividing the on-glass conductive layer into a plurality of segments. When skew is detected, or when otherwise triggered, voltage(s) may be provided to one or more portions of the on-glass conductive layer to encourage preferential extension and/or retraction.

Figure 9A:
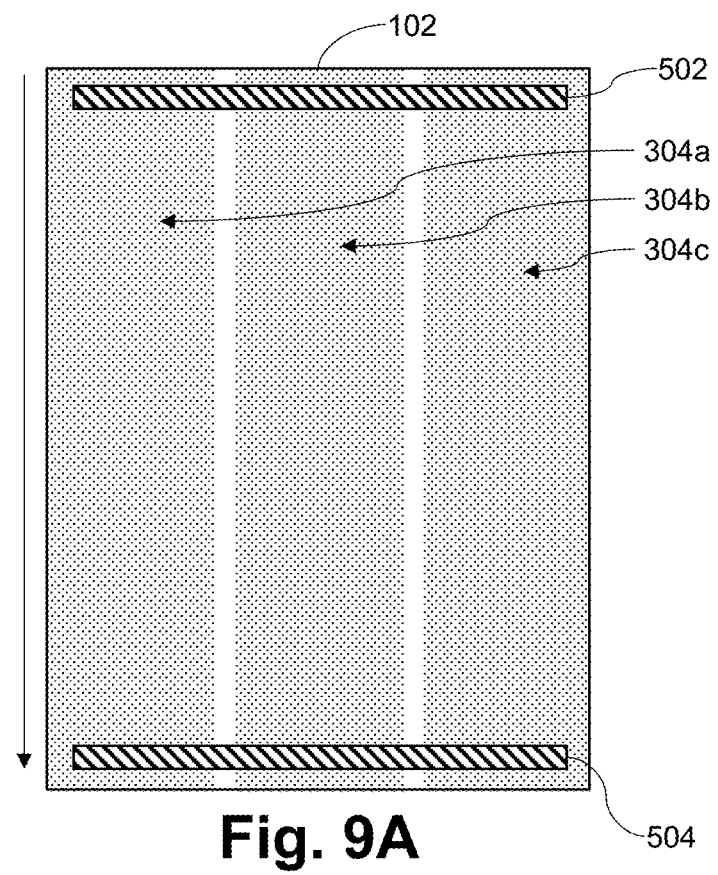
FIG. 9A is a plan view of a substrate incorporating a first set of segmented on-glass components from the FIG. 5 example, in accordance with certain example embodiments.

FIG. 9A is a plan view of a substrate incorporating a first set of segmented on-glass components from the FIG. 5 example, in accordance with certain example embodiments. Compared to the on-glass components 304 in FIG. 5, different zones 304a-304c are created in the FIG. 9A example. This may be accomplished by partitioning ITO-coated PET and providing multiple partitions, thereby creating the multiple zones 304a-304c. The FIG. 9A example is for a vertically oriented shade and, thus, the partitions are generally vertically oriented as well. Selective voltage control can be implemented with respect to the multiple zones 304-304c. For instance, different voltages can be applied to each of the individual areas, some areas may receive no voltage whereas some may receive voltage, etc., e.g., to encourage selective extension and/or retraction. As a result, in a vertical arrangement, the left and right sides of the shade, and any number of optional intermediary zones, can be driven independently to promote correction in the event that coil skew occurs. In the FIG. 9A example, independent control of the voltage across the width of the shade is provided. It will be appreciated that similar techniques may be used in connection with a horizontally-arranged shade in that, for example, multiple generally horizontal zones can be created and driven independently to promote coil correction.

Patterning may be performed by applying separate areas of ITO-coated PET, or other materials having conductive coatings formed thereon. In certain example embodiments, laser etching, ablation, photolithographic etching, and/or other techniques, may be used to pattern some or all of the on-glass components, thereby creating different zones. In certain example embodiments, different zones of material may be created by applying multiple strips or other portions of material across the surface of the substrate such that adjacent strips or other portions are not in electrical contact or communication with one another.

Figure 9B:
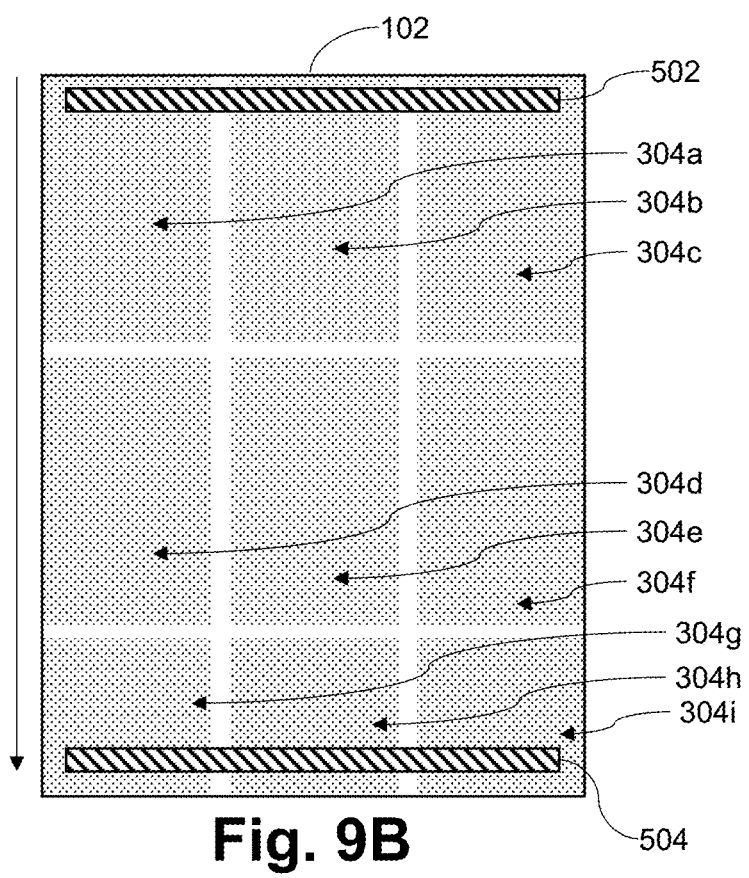
FIG. 9B is a plan view of a substrate incorporating a second set of segmented on-glass components from the FIG. 5 example, in accordance with certain example embodiments.

Any suitable pattern may be used in different example embodiments. For instance, rather than using a vertical pattern such as that shown in FIG. 9A, the pattern shown in FIG. 9B may be used. FIG. 9B is a plan view of a substrate incorporating a second set of segmented on-glass components from the FIG. 5 example, in accordance with certain example embodiments. In FIG. 9B a more grid-like pattern is provided, with zones 304a-304i occupying multiple rows and multiple columns. In general, for vertically extending/retracting embodiments, at least two vertical zones should be provided, and one or more horizontal zones should be provided. In general, for horizontally extending/retracting embodiments, at least two horizontal zones should be provided, and one or more vertical zones should be provided. The zones may have the same size, shape, and dimensions (e.g., as shown in FIG. 9A), or different size, shape, and/or dimensions may be provided (e.g., as shown in FIG. 9B). In certain example embodiments, separate zones proximate the lower bar 504 need not necessarily be provided.

Coil skewing can be detected by any suitable technique. For example, optical imaging techniques can be used to determine if the coil appears to be higher/lower and/or thicker/thinner on one side than the other. In certain example embodiments, a camera or other imaging means can be located at a peripheral edge of the assembly. It may take a picture of the coil and pass data corresponding to the picture to processing circuitry. If the processing circuitry "sees" the coil being skewed (e.g., because it appears to be higher/lower and/or thicker/thinner), the coil may be deemed skewed. In vertical arrangements, it may be advantageous to provide cameras or the like at the top and/or bottom of the assembly, whereas it may be advantageous to provide cameras or the like at the left and/or right sides of the assembly in horizontal arrangements. However, different placements may be used in different example embodiments.

In certain example embodiments, coil correction may be triggered by a user pressing a button on the window, a remote control operably connected to the window, and/or the like.

In certain example embodiments, coil skewing can be detected by implementing capacitance sensors. For instance, different capacitance sensors can be provided to different respective zones. The capacitance sensor array can work together with the power supply to selectively introduce the voltage(s) to one or more of the zones to help with the correction of the coil skewing by balancing out the capacitance in each partitioned zone. The capacitance sensors take advantage of the fact that electrostatic forces help drive the unfurling of the shade and help "hold" the at least partially unfurled shade to the glass. Because different amounts of unfurling will create different capacitive couplings (and thus different capacitances in different zones), the differences can be measured and determined to reflect partial or uneven unfurling.

Assume, for example, that the shutter in the FIG. 9B example unfurled to a large extent towards the left of the window but only to a small amount towards the right of the window, extending at a lower edge from a point approximately in the vertical center of zone 304d to the lower right corner of zone 304c. In this hypothetical, if the shade were unfurled evenly, the capacitance in zone 304d should match the capacitance in zones 304e and 304f. However, because the shade coil is skewed, capacitive sensors measuring the capacitance at zone 304d and 304e would report different values, and both such values would be markedly different from the output for zone 304f (where there is no contact with the skewed coil). A capacitance difference similarly would appear as between the zones 304a-304c in the FIG. 9A example if this type of skew were to take place.

Different comparisons can be made in different example embodiments. For instance, in certain example embodiments, zones at opposing edges of the window can be compared with one another. For instance, if a large absolute difference in capacitance is detected, skew may be inferred. In certain example embodiments, a zone at one edge can be considered a reference, and zones adjacent thereto can be considered against the reference. For instance, if all, most, or some zones are determined to have capacitances within a threshold distance from the reference capacitance, a determination of no skew may be made. The threshold may be constant in certain example embodiments, whereas the threshold may be increasing (or decreasing) as distance from the reference zone increases in other example embodiments. In certain example embodiments, capacitance may be measured between adjacent pairs of zones. For instance, if all, most, or some adjacent zone pairs are within a threshold, a determination of no skew may be made.

Because capacitance can be measured in real-time, self-detection and self-correction of coil skew also can be performed in real-time. For instance, voltage(s) may be applied to one or more zones to preferentially encourage extension and/or retraction. For instance, when the shade is extending and the left side is more fully extended than the right side, voltage can be triggered for the zone with the shortest extension first, the zone with the second shortest extension second, etc. Alternatively, voltage can be triggered for all zones but maintained for a longer period of time for the zone with the shortest extension compared to the zone(s) with greater (but still not full) extensions. Full extension and lack of skew may be determined when the capacitance in each partitioned zone is balanced, or at least balanced within a threshold.

The capacitance can be measured between the coil and each partition in the ITO coated PET, e.g., using one or more sensing circuits. A comparator may be configured to compare the measured capacitance in two or more partitions and control a voltage controller to increase and/or decrease the voltages $V_1$, $V_2$, $V_3$, and/or $V_n$, provided to the various zones.

FIG. 10 is a schematic view showing the FIG. 9A example with a plurality of sensing circuits 1002a-1002n and a voltage controller 1006 for correcting coil skew, in accordance with certain example embodiments. In the FIG. 10 example, sensing circuits 1002a-1002n may monitor the frequency changes in an in oscillating circuit coupled to a partition as the coil extends and/or retracts. In the FIG. 10 example, the number of sensing circuits matches the number of zones (although this need not necessarily be the case in different examples). In the FIG. 10 example, the first sensing circuit 1002a is connected to the first zone 304a to provide a left-side reference, the second sensing circuit 1002b is connected to the first zone 304a and second zone 304b to provide a difference calculation, the nth sensing circuit 1002n is connected to the nth zone 304n to provide a right-side reference, the third sensing circuit 1002c is connected to the nth zone 304n and the third zone 304c, etc.

In this example, as the coil extends or retracts, the capacitance formed between the coil and the partitions changes. The capacitance formed between the coil and the partition may be connected in parallel to capacitor C and in series with resistor R. The resistor and the overall capacitance of the two capacitors will determine the frequency at which the RC oscillator oscillates. As the overall capacitance of the two capacitors connected in parallel changes, the oscillating frequency also changes (e.g., bigger capacitance results in lower frequency). A comparator circuit 1004 can compare the oscillating frequency to one or more reference frequency or frequencies of other zones to determine in which partitions to increase and/or decrease the applied voltage.

Figure 11:
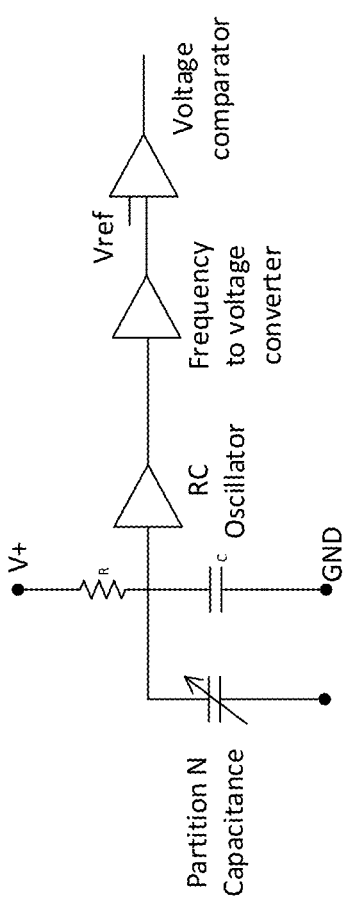
FIG. 11 is a first example comparator circuit which may be used in certain example embodiments.
Figure 12:
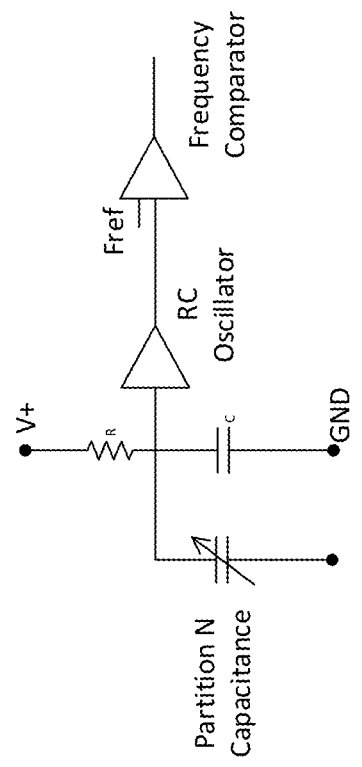
FIG. 12 is a second example comparator circuit which may be used in certain example embodiments.

FIG. 11 is a first example comparator circuit which may be used in certain example embodiments, and FIG. 12 is a second example comparator circuit which may be used in certain example embodiments. In certain example embodiments, a frequency-to-voltage converter may receive the oscillating signal and generate a voltage value representative of the oscillating frequency. The voltage value can be compared to one or more reference voltages or voltages corresponding to oscillating signals in other partitions to determine in which partitions to increase and/or decrease the applied voltage.

It will be appreciated that different circuit designs may be used in different example embodiments, and that the above-described and/or other comparison approaches may be used in different example embodiments. For instance, in certain example embodiments, modifications to the circuit design may be made so that the rate at which the oscillating frequency increases or decreases can be measured and compared.

As noted above, the zones may have the same or different sizes, shapes, and/or dimensions, in different example embodiments. The comparison may be simpler to perform and/or the results may be more accurate in example embodiments where there zones have at least the same surface area.

It will be appreciated that capacitance should be the same when the coil is "straight" or not skewed (or at least not significantly skewed). However, there could still be some variations caused by, for example, non-uniform thickness of the shade, non-uniform charge on substrate and shade surfaces, non-uniform friction during the shade movement, non-perfect levelling the shade, debris on the charged surfaces, arcing of the conductive surfaces, and so on. Thus, certain example embodiments may take into account these and/or other variables, if known a priori, and/or by applying thresholding techniques where results are considered equal if they differ by no more than a predefined threshold.

Voltage(s) can be measured before, during, and/or after extension and/or retraction, in order to identify skew, in different example embodiments. Similarly, voltage(s) can be provided to correct for skew before, during, and/or after extension and/or retraction, in different example embodiments. As noted above, for example, techniques may be employed for actively encouraging retraction using electrostatic forces, and these techniques may be applied to correct for skew (e.g., to encourage retraction in one zone while the shade is held in place in another, to encourage retraction in one zone while extension is encouraged in another, etc.).

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface three. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S. Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an insulating glass (IG) unit is provided. First and second substrates each have interior and exterior major surfaces, with the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes a first conductive coating provided, directly or indirectly, on the interior major surface of the first substrate, the first conductive coating being divided into a plurality of zones that are electrically isolated from one another; a dielectric or insulator film provided, directly or indirectly, on the first conductive coating; and a shutter including a polymer substrate supporting a second conductive coating, wherein the polymer substrate is extendible to a shutter closed position and retractable to a shutter open position; the first and/or second conductive coatings are electrically connectable to a power source that is controllable to set up an electric potential difference and create electrostatic forces to drive the polymer substrate to the shutter closed position.

In addition to the features of the previous paragraph, in certain example embodiments, the power source may be electrically connected to the zones, and the IG unit may further comprise a controller configured to enable the power source to deliver voltage(s) to the zones independent of one another.

In addition to the features of either of the two previous paragraphs, in certain example embodiments, the polymer substrate may be configured to preferentially extend proximate to zones that receive voltage(s) compared to other zones that do not.

In addition to the features of any of the three previous paragraphs, in certain example embodiments, the first conductive coating may be divided into at least three zones.

In addition to the features of any of the four previous paragraphs, in certain example embodiments, the zones may be arranged in rows and/or columns.

In addition to the features of any of the five previous paragraphs, in certain example embodiments, the zones may the same size and shape.

In addition to the features of any of the six previous paragraphs, in certain example embodiments, sensing circuitry may be configured to measure capacitances at different zones.

In addition to the features of any of the seven previous paragraphs, in certain example embodiments, the polymer substrate may be structured to coil when retracting and uncoil when extending, and the IG unit may further comprise a controller configured to infer whether the polymer substrate coil is skewing during extension and/or retraction, based on the measured capacitances.

In addition to the features of any of the eight previous paragraphs, in certain example embodiments, skew of the polymer substrate coil may be inferred based on different zones having measured capacitances that differ from one another by more than a predetermined threshold, based on different zones having measured capacitances that differ from measured capacitance(s) of one or more reference zones by more than a predetermined threshold (e.g., with the one or more reference zones being the outermost zone(s) in the IG unit), etc.

In addition to the features of any of the nine previous paragraphs, in certain example embodiments, the controller may be further configured to control the power source to selectively deliver voltage(s) to the zones to correct inferred skew of the polymer substrate coil.

In addition to the features of any of the 10 previous paragraphs, in certain example embodiments, the polymer substrate may be configured to preferentially extend proximate to zones that receive voltage(s) compared to other zones that do not.

In certain example embodiments, a glass substrate comprises a dynamically controllable shade provided thereon. The shade includes a first conductive coating provided, directly or indirectly, on a major surface of the substrate, with the first conductive coating being divided into a plurality of zones that are electrically isolated from one another; a dielectric or insulator film provided, directly or indirectly, on the first conductive coating; and a shutter including a polymer substrate supporting a second conductive coating. The polymer substrate is extendible to a shutter closed position and retractable to a shutter open position. The first and/or second conductive coatings are electrically connectable to a power source that is controllable to set up an electric potential difference and create electrostatic forces to drive the polymer substrate to the shutter closed position.

In addition to the features of the previous paragraph, in certain example embodiments, the polymer substrate may be structured to coil when retracting and uncoil when extending, with polymer substrate coil skew being inferable from capacitances measured at the zones.

In addition to the features of either of the two previous paragraphs, in certain example embodiments, the power source may be controllable to selectively deliver voltage(s) to the zones to correct inferred skew of the polymer substrate coil.

In addition to the features of any of the three previous paragraphs, in certain example embodiments, the polymer substrate may be configured to preferentially extend proximate to zones that receive voltage(s) compared to other zones that do not.

In certain example embodiments, a method of making an insulating glass (IG) unit is provided. The method comprises: having first and second substrates, each having interior and exterior major surfaces, the interior major surface of the first substrate facing the interior major surface of the second substrate; and providing a dynamically controllable shade on the first and/or second substrate. The shade includes a first conductive coating provided, directly or indirectly, on the interior major surface of the first substrate, with the first conductive coating being divided into a plurality of zones that are electrically isolated from one another; a dielectric or insulator film provided, directly or indirectly, on the first conductive coating; and a shutter including a polymer substrate supporting a second conductive coating, wherein the polymer substrate is extendible to a shutter closed position and retractable to a shutter open position. The first and second substrates are connected to one another in substantially parallel, spaced apart relation, such that a gap is defined therebetween and such that the dynamically controllable shade is located in the gap. The first and/or second conductive coatings are electrically connectable to a power source that is controllable to set up an electric potential difference and create electrostatic forces to drive the polymer substrate to the shutter closed position.

In addition to the features of the previous paragraph, in certain example embodiments, the zones may be arranged in rows and/or columns.

In addition to the features of either of the two previous paragraphs, in certain example embodiments, the zones may have the same size and shape.

In addition to the features of any of the three previous paragraphs, in certain example embodiments, sensing circuitry may be electrically connected to the zones, with the sensing circuitry being configured to measure capacitances at the different zones.

In addition to the features of any of the four previous paragraphs, in certain example embodiments, the polymer substrate may be structured to coil when retracting and uncoil when extending, and the method may further comprise providing a controller configured to infer whether the polymer substrate coil is skewing during extension and/or retraction, based on the measured capacitances.

In addition to the features of any of the four previous paragraphs, in certain example embodiments, skew of the polymer substrate coil may be inferred based on (a) different zones having measured capacitances that differ from one another by more than a predetermined threshold, and/or (b) different zones having measured capacitances that differ from measured capacitance(s) of one or more reference zones by more than a predetermined threshold, the one or more reference zones being the outermost zone(s) in the IG unit.

In addition to the features of any of the five previous paragraphs, in certain example embodiments, the controller may be further configured to control the power source to selectively deliver voltage(s) to the zones to correct inferred skew of the polymer substrate coil.

In addition to the features of any of the six previous paragraphs, in certain example embodiments, the polymer substrate may be configured to preferentially extend proximate to zones that receive voltage(s) compared to other zones that do not.

In certain example embodiments, a method of operating a dynamic shade in an insulating glass (IG) unit is provided. The method comprises having an IG unit made in accordance with the techniques disclosed herein; and providing voltage(s) to one or more zones to help correct shutter skew. For instance, the method may comprising selectively activating the power source to move the polymer substrate between the shutter open and closed positions and providing power to the zones, selectively, to correct for skew in the polymer substrate coil.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:
   a controller;
   first and second substrates, each having interior and exterior major surfaces, the interior major surface of the first substrate facing the interior major surface of the second substrate;
   a spacer system helping to maintain the first and second substrates in substantially parallel spaced apart relation to one another and to define a gap therebetween; and
   a dynamically controllable shade interposed between the first and second substrates, the shade including:
      a first conductive coating provided, directly or indirectly, on the interior major surface of the first substrate, the first conductive coating being divided into a plurality of zones that are electrically isolated from one another,
      a dielectric or insulator film provided, directly or indirectly, on the first conductive coating; and
      a shutter including a polymer substrate supporting a second conductive coating, wherein the polymer substrate is extendible to a shutter closed position and retractable to a shutter open position;
   wherein the first and/or second conductive coatings are electrically connectable to a power source that is controllable to set up an electric potential difference and create electrostatic forces to drive the polymer substrate to the shutter closed position,
   wherein the polymer substrate is structured to coil when retracting and uncoil when extending, and
   wherein the controller is configured to infer whether the polymer substrate coil is skewing during extension and/or retraction.

2. The IG unit of claim 1, wherein the power source is electrically connected to the zones, and
   wherein the controller is configured to enable the power source to deliver voltage(s) to the zones independent of one another.

3. The IG unit of claim 2, wherein the polymer substrate is configured to preferentially extend proximate to zones that receive voltage(s) compared to other zones that do not.

4. The IG unit of claim 1, wherein the first conductive coating is divided into at least three zones.

5. The IG unit of claim 1, wherein the zones are arranged in rows and/or columns.

6. The IG unit of claim 1, wherein the zones have the same size and shape.

7. The IG unit of claim 1, further comprising sensing circuitry configured to measure capacitances at different zones.

8. The IG unit of claim 7, wherein the controller is configured to infer whether the polymer substrate coil is skewing during extension and/or retraction, based on the measured capacitances.

9. The IG unit of claim 8, wherein skew of the polymer substrate coil is inferred based on different zones having measured capacitances that differ from one another by more than a predetermined threshold.

10. The IG unit of claim 8, wherein skew of the polymer substrate coil is inferred based on different zones having measured capacitances that differ from measured capacitance(s) of one or more reference zones by more than a predetermined threshold, the one or more reference zones being the outermost zone(s) in the IG unit.

11. The IG unit of claim 8, wherein the controller is further configured to control the power source to selectively deliver voltage(s) to the zones to correct inferred skew of the polymer substrate coil.

12. The IG unit of claim 11, wherein the polymer substrate is configured to preferentially extend proximate to zones that receive voltage(s) compared to other zones that do not.

13. A glass substrate, comprising a dynamically controllable shade provided thereon, the shade including:
- a first conductive coating provided, directly or indirectly, on a major surface of the substrate, the first conductive coating being divided into a plurality of zones that are electrically isolated from one another,
- a dielectric or insulator film provided, directly or indirectly, on the first conductive coating; and
- a shutter including a polymer substrate supporting a second conductive coating, wherein the polymer substrate is extendible to a shutter closed position and retractable to a shutter open position;
- wherein the first and/or second conductive coatings are electrically connectable to a power source that is controllable to set up an electric potential difference and create electrostatic forces to drive the polymer substrate to the shutter closed position,
- wherein the polymer substrate is structured to coil when retracting and uncoil when extending, and
- wherein polymer substrate coil skew is inferable during extension and/or retraction.

14. The substrate of claim 13, wherein polymer substrate coil skew is inferable from capacitances measured at the zones.

15. The substrate of claim 14, wherein the power source is controllable to selectively deliver voltage(s) to the zones to correct inferred skew of the polymer substrate coil.

16. The substrate of claim 15, wherein the polymer substrate is configured to preferentially extend proximate to zones that receive voltage(s) compared to other zones that do not.

17. A method of making an insulating glass (IG) unit, the method comprising:
- having first and second substrates, each having interior and exterior major surfaces, the interior major surface of the first substrate facing the interior major surface of the second substrate;
- providing a dynamically controllable shade on the first and/or second substrate, the shade including:
  - a first conductive coating provided, directly or indirectly, on the interior major surface of the first substrate, the first conductive coating being divided into a plurality of zones that are electrically isolated from one another,
  - a dielectric or insulator film provided, directly or indirectly, on the first conductive coating; and
  - a shutter including a polymer substrate supporting a second conductive coating, wherein the polymer substrate is extendible to a shutter closed position and retractable to a shutter open position;
- connecting the first and second substrates to one another in substantially parallel, spaced apart relation, such that a gap is defined therebetween and such that the dynamically controllable shade is located in the gap;
- providing a controller;
- wherein the first and/or second conductive coatings are electrically connectable to a power source that is controllable to set up an electric potential difference and create electrostatic forces to drive the polymer substrate to the shutter closed position,
- wherein the polymer substrate is structured to coil when retracting and uncoil when extending, and
- wherein the controller is configured to infer whether the polymer substrate coil is skewing during extension and/or retraction.

18. The method of claim 17, wherein the zones are arranged in rows and/or columns.

19. The method of claim 17, wherein the zones have the same size and shape.

20. The method of claim 17, further comprising electrically connecting sensing circuitry to the zones, the sensing circuitry being configured to measure capacitances at the different zones.

21. The method of claim 20, wherein the controller is configured to infer whether the polymer substrate coil is skewing during extension and/or retraction, based on the measured capacitances.

22. The method of claim 21, wherein skew of the polymer substrate coil is inferred based on (a) different zones having measured capacitances that differ from one another by more than a predetermined threshold, and/or (b) different zones having measured capacitances that differ from measured capacitance(s) of one or more reference zones by more than a predetermined threshold, the one or more reference zones being the outermost zone(s) in the IG unit.

23. The method of claim 21, wherein the controller is further configured to control the power source to selectively deliver voltage(s) to the zones to correct inferred skew of the polymer substrate coil.

24. The method of claim 23, wherein the polymer substrate is configured to preferentially extend proximate to zones that receive voltage(s) compared to other zones that do not.

25. A method of operating a dynamic shade in an insulating glass (IG) unit, the method comprising:
- having an IG unit made in accordance with the method of claim 17;
- selectively activating the power source to move the polymer substrate between the shutter open and closed positions;
- providing power to the zones, selectively, to correct for skew in the polymer substrate coil.

26. The IG unit of claim 1, wherein:
- the power source is electrically connected to the zones,
- the zones are provided on a common plane on the interior major surface of the first substrate,
- the controller is configured to enable the power source to deliver voltage(s) to the zones independent of one another, and
- the polymer substrate, when driven to the shutter closed position, overlaps at least some of the zones when viewed from a direction perpendicular to a shutter extension-retraction direction.

* * * * *